Figure 1:
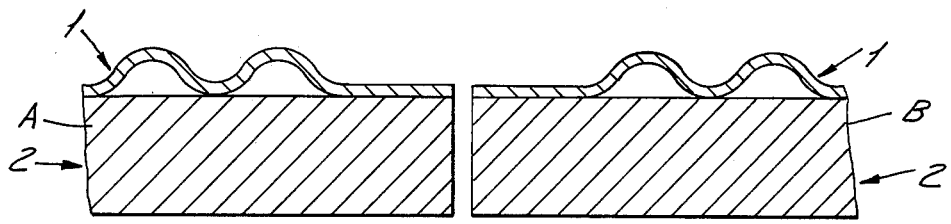

United States Patent [19]

Keifert et al.

[11] 4,032,243

[45] June 28, 1977

[54] JOINT FABRICATION AND METHOD FOR FORMING THE SAME

[75] Inventors: Hibbard G. Keifert, Torrance, Calif.; Frank J. Waters, deceased, late of Northridge, Calif., by Ethel M. Waters, administratrix

[73] Assignee: Fansteel Inc., North Chicago, Ill.

[22] Filed: Oct. 18, 1976

[21] Appl. No.: 733,245

[52] U.S. Cl. .............................. 403/272; 228/165
[51] Int. Cl.² ........................................ F16B 5/8
[58] Field of Search .......... 52/758 B, 578; 228/165; 285/286; 403/270, 271, 272; 220/1 B, 3, 75, 76; 138/142, 143

[56] References Cited
UNITED STATES PATENTS 3,443,306  5/1969  Meyer ............................ 228/165
3,457,961  7/1969  Long ............................ 220/3

Primary Examiner—John E. Murtagh
Attorney, Agent, or Firm—Barnes, Kisselle, Raisch & Choate

[57] ABSTRACT

A wall assembly and method for making the same which consists essentially of a layer of first metallic material and a layer of second metallic material, each layer having one face in a face-to-face contact, either bonded or unbonded relation with a face of the other layer, containing a fusion weld joining two members of the first layer, and fusion welds joining the layer of second material of such member in edge abutting relation to an inlaid insert over a flush insert of second material inset into said first layer so as to provide a relatively smooth surface in the second material of the wall.

21 Claims, 25 Drawing Figures

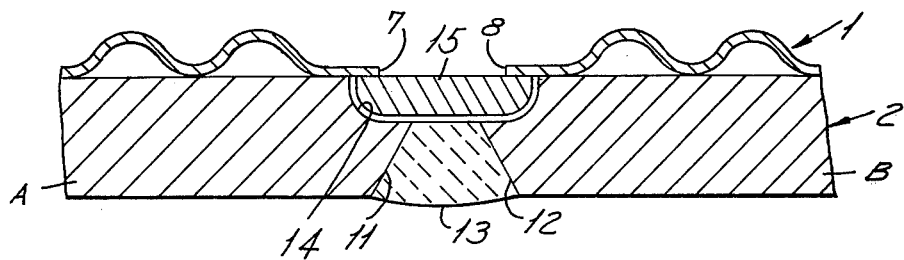
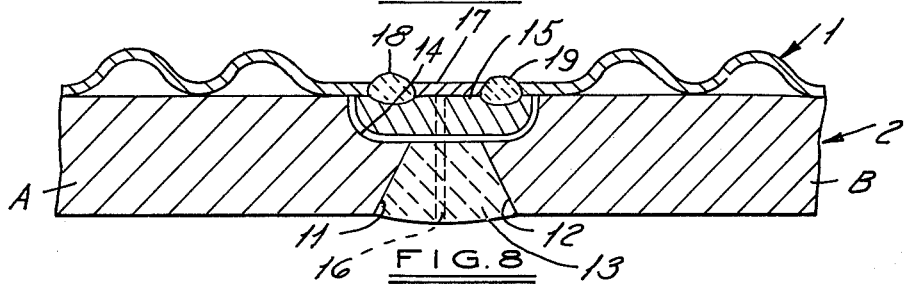
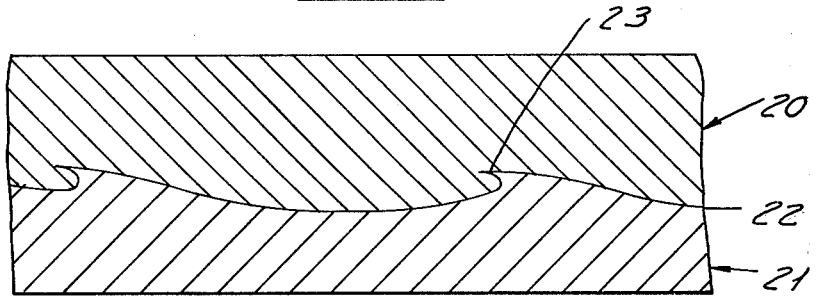
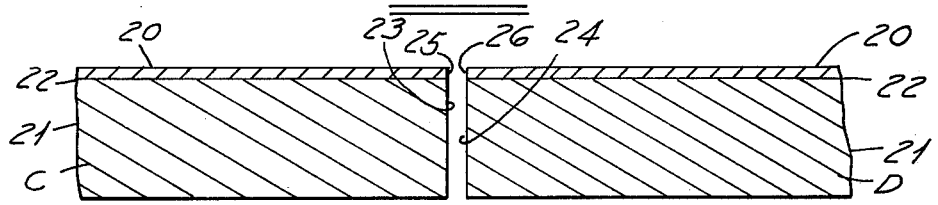
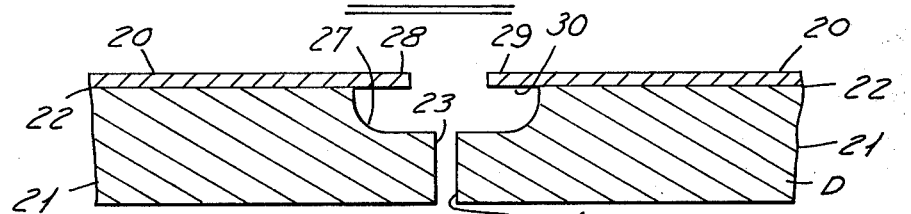
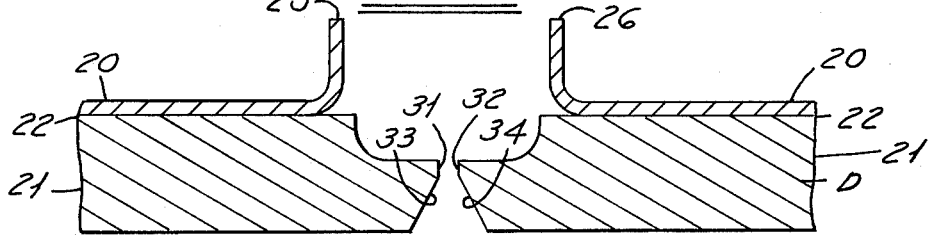

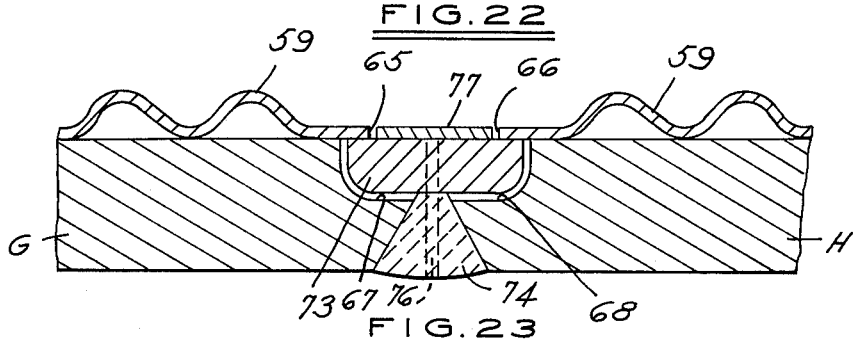
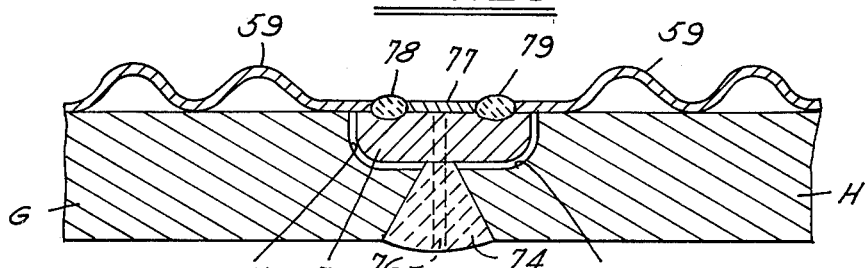
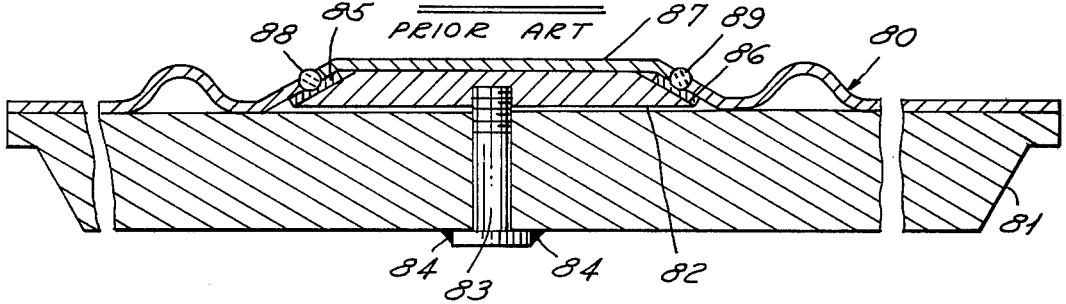
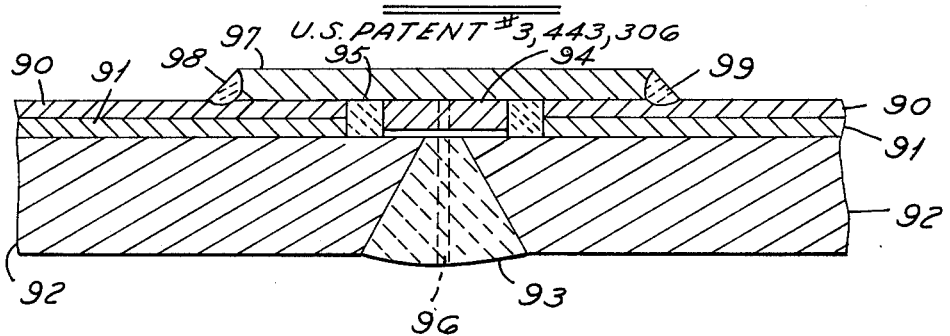

JOINT FABRICATION AND METHOD FOR FORMING THE SAME

This invention relates to an Improved Joint Fabrication and to a Method for Forming the Same. More specifically, the invention relates to an improved, highly versatile method for making high quality fusion welded joints in the fabrication of industrial equipment, especially of chemical process equipment. It relates especially to welded joints in equipment in which a surface lining or facing of a special purpose metal or alloy is used in conjunction with a backing or substrate of another metal or alloy that is not generally metallurgically compatible with the lining material. The improved method of fabrication described herein can be applied to any extremely large number of dissimilar metal combinations. Some of the combination include; tantalum, columbium, vanadium, titanium, zirconium or hafnium, or their alloys, as liners or layers on mild steel; tantalum or columbium liners or layers on copper-base alloys; tantalum plus copper layers on mild steel; and tantalum layers on nickel or nickel-base alloys, or on cobalt-base alloys. The improved method is versatile; the liner or layer of the special purpose metal or alloy may be bonded by techniques including explosive cladding (such as by the Detaclad process, trademark of E. I. duPont de Nemours and Co.), and roll bonding to the backing, and brazing, such as with silver brazing alloys; or the lining or facing may simply be in close contact as an unbonded, loose, or thermal-expansion compensated lining.

The use of such a special purpose metal or alloy lining or facing on a more common base metal backing is well know in the state-of-the-art. However, methods for fabrication of such equipment present severe problems, especially at joints when the lining material is not generally metallurgically compatible with the backing material. To define the statement "not generally metallurgically compatible," consider the case of a tantalum liner or layer on a mild steel backing. The melting points of these materials differ widely: Tantalum melts at about 300° C (5430° F), and mild steel melts at about 1530° C (2790° F); mild steel has a coefficient of thermal expansion about twice that of tantalum; and iron and tantalum do not alloy to produce ductile alloys (the tantalum-iron phase system contains the intermetallic compound $TaFe_2$ and eutectics between this compound and the very limited solid solubility, terminal solid solutions – see FIG. 11, p. 461, "Columbium and Tantalum," by F. T. Sisco and E. Epremian, published by John Wiley and Sons, Inc., 1963).

To overcome these metallurgical incompatibilities, U.S. Pat. No. 3,443,306 utilizes a copper layer about 0.060 inch thickness between the tantalum and the steel base. In this method of weld assembly, the thickness of the copper layer is critical, and the technique applies only to the specific triclad construction described in which the copper intermediate layer must be integrally bonded to both the steel substrate and the outer tantalum layer. The final weld joint contains an outer projecting battan strap of tantalum which is joined by fillet welds to the underlining tantalum cladding. The fillet welds at the ends of the projecting battan strap cannot meaningfully be X-rayed inspected for code weld quality, so techniques such as soap tests, helium leak tests with a mass spectrometer, or penetrant dye tests are used to monitor weld quality.

One principal object of this invention is to provide a versatile method of fabrication for fusion welding of equipment comprised of a combination of a lining or facing of a special purpose metal or alloy, especially the refractory metals and reactive metals and their alloys, and a ferrous or non-ferrous base metal on which the lining or facing material may either be bonded or unbonded.

An additional object is to provide a method of fabrication that will simplify and improve the fit up of the lining or facing in joining either bonded or unbonded equipment in which the wall is constructed of two or more layers.

Another object is to provide a method of fabrication to produce sound, high-quality, contamination-free welds independently in the base metal and in the lining or facing.

A further object is to provide a method for fabrication of such above-mentioned combinations of dissimilar metals or alloys so as to achieve a final smooth geometry in the finished welded assembly that will not have projections or surface irregularities such as batten straps, especially on the process side of chemical process equipment.

Other objects and features of the invention will be apparent in the following description and claims in which the principles of the invention are set forth together with a detailed specification directed to those skilled in this art describing the manner in which the objects of the invention are achieved all in connection with the best modes presently contemplated for the practice of the invention.

Drawings accompany the disclosure and the various views thereof may be briefly described as:

FIGS. 1 through 7, the sequential steps in preparing the lining and base metals and in making the fusion welds when the lining is unbonded to the base metal.

FIG. 8, the typical, irregular bond interface observed at a magnification of 100X for tantalum explosively bonded to mild steel.

FIGS. 9 through 13, the sequential steps in preparing the lining and base metal, and in making the fusion welds when the lining is bonded to the base metal.

Figure 14:
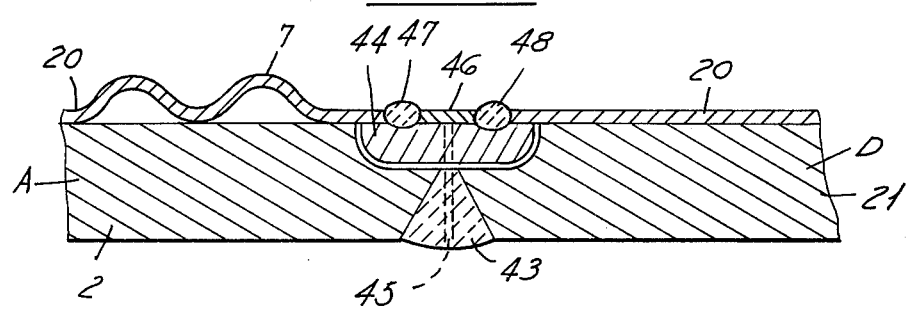

FIG. 14, a completed welded assembly in which one member has an unbonded liner and the other member has a bonded liner.

Figure 15:
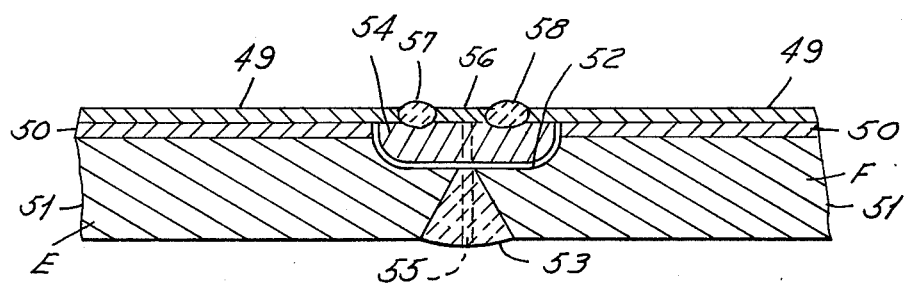

FIG. 15, a completed welded assembly in a triclad, bonded wall construction.

FIGS. 16 through 23, the sequential steps in an alternative process for fabricating the welded wall construction according to this invention.

FIG. 24, a welded wall construction used in the prior art for fabricating loose lined or unbonded lined chemical process equipment.

FIG. 25, the welded wall construction of prior art, U.S. Pat. No. 3,443,306, as applied to a triclad bonded tantalum-copper-steel material.

The figures and examples will be given as specific embodiments in which a tantalum material is employed as the lining or facing material and mild steel or other iron-base alloys as the backing material. Tantalum-lined chemical process equipment has been used in a number of chemical process applications where the tantalum lining provides corrosion resistance to the corrosive environment. But because of the high cost of tantalum, thin liners or layers of this special purpose material are used to resist the corrosive conditions, and a low cost base material, commonly mild or plain carbon steel, is used as the backing and principal structural member of the equipment. Such typical chemical process equipment includes bayonet heaters, heat exchangers, condensers, towers, columns and other vessels, piping, fitting and valves.

In the specific embodiments described in the examples, the lining is formulated of tantalum or a tantalum alloy such as Fansteel "63" Metal manufactured by Fansteel Inc. (assignee of the present application), which contains 2.5 weight percent tungsten, 0.15 weight percent columbium, with the balance being essentially tantalum as discussed in commonly assigned U.S. Pat. No. 3,592,639. Fansteel 63 Metal has about 50 percent higher ultimate tensile strength and about twice the yield strength compared to unalloyed tantalum at a temperature of about 200° C (390° F), which is a typical process temperature in some chemical applications. This alloy generally shows at least equivalent corrosion resistance to pure tantalum in many environments.

While the lining materials described is tantalum or Fansteel 63 Metal in the specific examples, it should be apparent to those skilled in the art that the methods of fabrication described in this invention can be equally well utilized when the lining material is any ductile, fabricable and weldable refractory metal or alloy, including other tantalum base alloys, columbium and clumbium-base alloys, vanadium and vanadium-base alloys, and also the reactive metals titanium, zirconium, and hafnium, and alloys having these reactive metal bases.

Also, the specific embodiments and examples that are described cite mild steel as the backing material. Again, it should be apparent that backings of this invention can be other common base metals, such as other steels, including stainless steels, copper-base, nickel-base and cobalt-base materials, or can be a refractory metal or reactive metal, or their alloys different from that of lining material. The backing of first material which provides the structural strength can be as above indicated or selected from metals or alloys of metals in Groups IVA and VA of the Periodic Table when different from those found in the second or corrosion resistant layer also selected from the same groups of the Periodic Table.

EXAMPLE 1

FIG. 1 shows a thermal expansion compensated liner 1 of Fansteel 63 Metal which is unbonded but in close contact to the mild steel substrate 2 of members A and B to be joined by fusion welding.

Such thermal expansion compensated liners have a series of corrugations which serve to act as bellows to compensate for the difference in coefficient of thermal expansion between the tantalum liner and steel base metal when the equipment is heated to the process temperature in the specific application. Such corrugations also provide substantial structural rigidity to the tantalum liner and help prevent collapse of the liner due to sharp changes in operational pressure. The thickness of the liner used will depend on the specific application, but commonly is in the thickness range of about 0.030 to 0.060 inch, but may range from as thin as about 0.020 inch up to as thick as about 0.125 inch.

The thickness of the steel backing also is governed by the specific operational conditions and equipment used and is covered by code requirements as specified by the ASME for unfired pressure vessels. Typical thickness for the steel backing commonly range from ¼ inch to 1 inch thickness; however, thicker or thinner backings are utilized in some cases.

Figure 2:
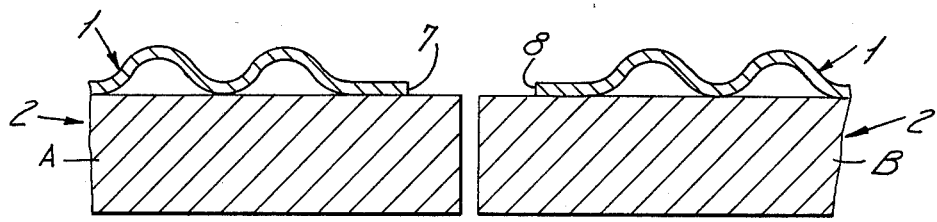

The abutting edges 3 and 4 of the tantalum linings and 5 and 6 of the steel substrate of members A and B to be joined are first prepared as clean, smooth and parallel faces as illustrated in FIG. 1. Next, liner 1 of both members A and B are cut back as illustrated in FIG. 2 so as to achieve a gap of about ½ inch or more between edges 7 and 8 of the liner on members A and B.

Figure 3:
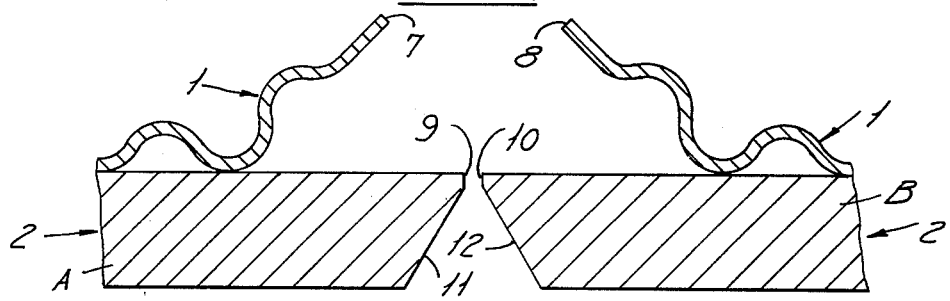
Figure 4:
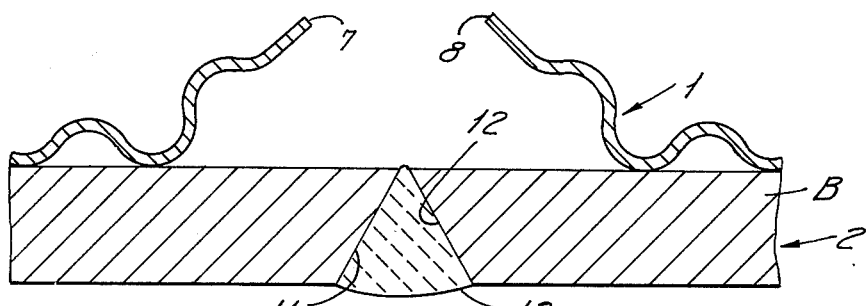

As illustrated in FIG. 3, the liner on both members is bent back (upwards as illustrated) so that it will not be damaged during machining of the steel backing. The edges of the steel backing are then prepared for fusion welding, illustrated as a 60° to 75° V-joint with root faces 9 and 10 and surfaces 11 and 12. The specific joint geometry used for the steel backing is in accordance with "Recommended Proportions of Grooves for Arc Welding," Welding Handbook, Sixth Edition, Section 1, American Welding Society. The welding procedure used for the steel backing is in accordance with the recommended practice abutting the same reference in order to produce code quality welds as illustrated in FIG. 4. The weld reinforcement on the face side of the steel weld 13 may or may not be dressed down smooth with the outside surface of steel base 2 of members A and B. Normally, the steel butt weld will be inspected for quality by X-ray techniques, and any defective areas will be repaired before proceeding to the next step.

Figure 5:
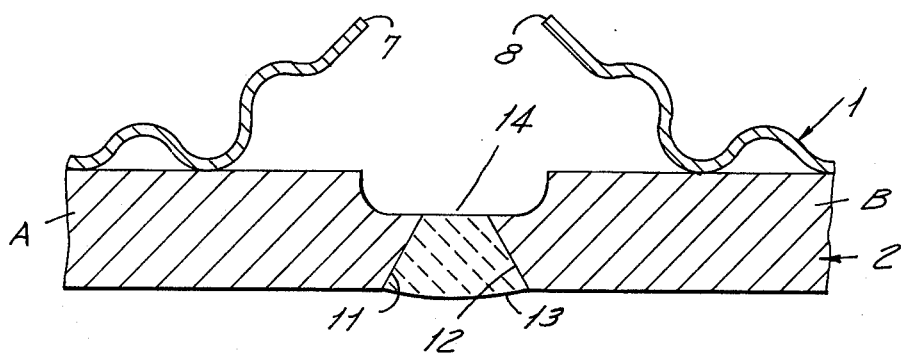

Next, a channel 14 is machined in the steel on the liner side as illustrated in FIG. 5. The width of the channel is slightly greater than the width of the strip 15 of the tantalum insert to be placed in channel 14 as illustrated in FIG. 6. The depth of channel 14 is essentially the same as the thickness of the tantalum inlay 15. In commercially used embodiments of chemical process equipment employing tantalum and tantalum alloy liners, the width of the tantalum or tantalum alloy inlay 15 should be a minimum of about 1 inch, and the thickness of inlay 15 is at least 0.040 inch and more commonly is 0.060 inch, but may, if desired, be as great as 0.090 to 0.125 inch. In FIG. 6 and other comparable figures, the strip 15 is shown with some space around it in the channel 14. This is simply to indicate that this strip is not welded or brazed into the channel but is merely laid into it.

Before placing inlay 15 of Fansteel 63 Metal or tantalum as shown in FIG. 6, all contaminants such as steel chips, oil and grease or other soils must be thoroughly removed from channel 14 by techniques such as solvent degreasing. The tantalum alloy inlay 15 and the tantalum alloy liner 1 must also be cleaned and free from any foreign contaminants. Then, the edges 7 and 8 tantalum alloy liner 1, are bent down in flush contact with inlay 15 as shown in FIG. 6.

Before making the welds in the tantalum alloy liner facing, it is common practice to provide purge holes 16 drilled through the steel weld and the tantalum alloy inlay 15. These purging holes 16 normally are left open even after completing the entire welded wall assembly, since these holes then serve a second purpose of being used for leak detection during service. The area to be welded must again be thoroughly cleaned and be free from any contaminants after drilling the purge holes 16 before placing an additional inset insert 17 of Fansteel 63 Metal or tantalum cut to fit flush and abut snugly with edges 7 and 8 of the tantalum alloy liner 1. The width of this inset insert 17 should be a minimum of about ½ inch and the thickness should be the same as that of liner 1. In some cases where the tantalum alloy liner is thin, such as 0.040 inch or even thinner, edges 7 and 8 of liner 1 and the edges of insert 17 may be bent upward to provide a lip which when melted down in the subsequent welding will provide at least a portion of filler material for the joint.

Adequate cleaning of the tantalum material and inert gas shielding is mandatory in welding tantalum and tantalum alloys. Tantalum and tantalum alloys can be successfully fusion welded using either inert gas shielded tungsten arc welding, or electron beam welding. In this example the welding procedure using inert gas shielded tungsten arc welding (often called TIG welding) is described.

The region of the tantalum alloy area to be welded is evacuated and purged with an inert gas. The inert gas can be any one or a mixture of inert monatomic gases such as argon, helium, neon, krypton or xenon, with argon generally being preferred. The entire assembly to be welded may be placed in a chamber which can be evacuated and back filled with the inert gas if this is feasible for the particular welds to be made.

Alternately, a plastic bag or sheet can be taped to liner 1 of both members A and B. A hose is fitted into the bag to inflate and purge the bag and the areas to be welded. Another hole is inserted in the bag to permit any residual air to exit and the argon is supplied continuously to flush out such residual contaminants. Also, the inert argon purging gas is fed through holes 16 to provide protection at the underside or root side of the weld in the tantalum liner.

The welding torch is inserted into an additional hole in the bag to make the welds in the tantalum alloy material. If desired, filler material of the same composition as the tantalum alloy being welded may be added so as to achieve good quality, complete penetration butt welds 18 and 19 joining the tantalum insert 17 to inlay 15 and to abutting edges 7 and 8 of liner 1 on sections A and B, thus completing the welded assembly.

The completed welded wall assembly has a relatively flush and smooth surface on the tantalum alloy clad side which is desirable to avoid projections on the chemical process side.

The welds on both the steel side and the tantalum alloy side should show no defects when tested by penetrant dye inspection; X-ray radiographs may also be made to check for defects in either the steel weld or the tantalum alloy welds. A sound, defect-free assembled wall can be achieved by the process described.

EXAMPLE 2

This example shows the application of this invention for making a wall assembly when both members of the tantalum alloy material are bonded to the steel substrate. FIG. 8 shows a drawing of the microstructure of a cross-section at a magnification of 100X showing the wavy bond interface between the Fansteel 63 Metal liner 20 and a steel substrate 21 as produced by the explosive cladding (Detaclad) process. In some cases, the wavy bond interface 22 shows wave crests 23 that actually capsulated some steel into the tantalum alloy material, or tantalum material into the steel along the bond line.

FIG. 9 shows members C and D of Detaclad material to be joined. Abutting faces 23 and 24 of the steel substrate and 25 and 26 of the tantalum alloy liner (cladding) are prepared initially smooth and parallel for the two memberes. Then, grooves 27 and 28 are individually machined in the members C and D, respectively, as shown in FIG. 10. The depth of groove in each member should be at least ½ inch as measured from abutting edges 23 and 24. During this machining, sufficient tantalum must be removed from the undersides 29 and 30 of the tantalum alloy liner 20 to remove any areas of iron that may be capsulated into the tantalum alloy along bonded interface 22 as discussed for FIG. 8.

Then, approximately ¼ inch of the liner is trimmed back to provide a gap of about ½ inch between abutting edges 25 and 26 of the liner 20. Following this the ends 25 and 26 of the liner 20 are bent upward as shown in FIG. 11.

Then the steel substrate is prepared for fusion welding by machining the joint with a 60° to 75° V-joint or U-joint with root faces 31 and 32 and groove faces 33 and 34 as illustrated in FIG. 11.

Figure 12:
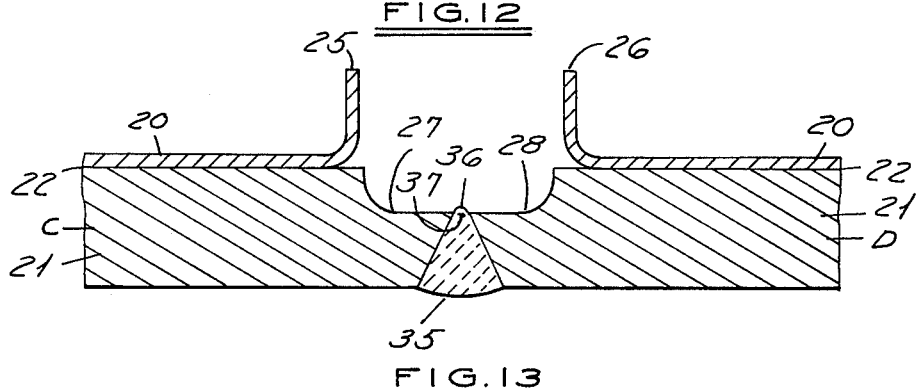

Then, as indicated in FIG. 12, the steel is fusion welded as described in Example 10. The weld reinforcement of steel weld 35 may be dressed flush with the outer surface of the steel, or it may be left as welded, depending on the specific requirements. Normally, the steel butt weld will be inspected for quality by X-ray techniques, and any defective areas will be repaired before proceeding to the next step.

Any excess metal 36 on the weld root is machined flush and level, as shown as 37, with the base of grooves 27 and 28 machined in the two members.

A tantalum alloy inlay insert 38 of the same composition as the tantalum alloy liner (Fansteel 63 Metal in this example) is cut with a width to fit the grooves 27 and 28 and with a thickness to seat in the groove in the steel and be flush and level with the bonded line 22 of the tantalum alloy liner and the steel. The space around inlay insert 38 is simply to show that it is laid into the receiving groove or channel and not welded or brazed.

Figure 13:
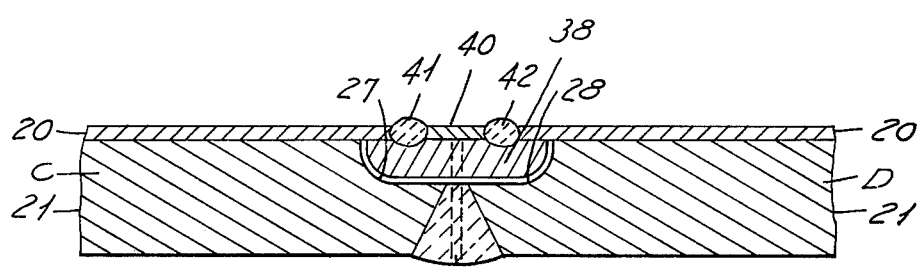

Then, weep holes 39 are drilled as shown in FIG. 13 through the center of the steel weld 35 and through inlay 38 to provide for purging on the root side of the weld to be made on the tantalum alloy side. These purging holes 39 normally are left open even after completing the entire welded wall assembly since these holes then serve a second purpose of being used for leak detection during service.

Next, the edges 25 and 26 of the tantalum alloy liner are bent in flush contact with inlay 38, and an additional inset insert 40 is cut to fit flush and snug in a space of about ½ inch between edges 25 and 26 of the cut back liner.

Finally, inert gas shielded tungsten arc welds 41 and 42 are made as described under Example 1 to make the complete welded wall assembly illustrated in FIG. 13.

Weld assemblies joining Fansteel 63 Metal or tantalum explosively bonded to steel will show good soundness and weld quality in penetrant dye and X-ray radiograph inspection of the steel and the tantalum material welds.

EXAMPLE 3

FIG. 14 illustrates a completed welded assembly joining a member A having an unbonded liner to member D having a bonded liner, with Fansteel 63 Metal as the liner and mild steel as the substrate in both members. The individual operations of preparing and welding of the unbonded and bonded members followed the same procedure as described in Examples 1 and 2, respectively.

In making the welded assembly, the weld reinforcement of steel weld 43 on the steel side is shown as not machined after welding. Normally, the steel butt weld will be inspected for quality by X-ray techniques and any defective areas will be repaired before proceeding to the next stop.

A Fansteel 63 Metal inlay insert 44 was cut to fit the channel in members A and the machined groove in member D, and was flush with the steel surface adjacent to the tantalum liner of both members. Purging holes 45 were drilled through the steel weld 43 and the tantalum inlay 44. These purging holes 45 normally are left open even after completing the entire welded wall assembly, since these holes then serve a second purpose of being used for leak detection during service.

Then, after bending the liner 7 and liner 20 on members A and D, respectively, back into flush contact with tantalum inlay 44, a tantalum alloy additional inset insert 46 was placed in flush abutting contact with the adjacent edges of liners 7 and 20.

Then, inert gas shielded tungsten arc welds 47 and 48 were made to join the tantalum alloy insert 46 to liners 7 and 20 and to the tantalum alloy inlay insert 44, thus completing the welded wall assembly.

The completed welded wall, illustrated in FIG. 14, will show good soundness and defect-free welds in both the steel side and the tantalum alloy side by dye penetrant and X-ray radiograph inspection.

EXAMPLE 4

The improved method of fabrication of this invention also can be applied to wall assemblies having more than two layers. FIG. 15 illustrates a welded wall assembly prepared according to the method of this invention with members E and F comprised of a layer of unalloyed tantalum, or tantalum alloy 63 Metal liner 49, which has been Detaclad bonded with an intermediate copper layer 50 to a substrate of mild steel 51. The method of preparing the joint in this triclad assembly is essentially the same as that described in Example 2 for a bi-clad (two-layer) wall of tantalum or Fansteel 63 Metal Detacled bonded to mild steel. Depending on the specific requirements, the groove 52 machined in members E and F may be machined only to the depth of the copper layer, or to the depth of the copper layer plus some of the steel; normally, the latter process is favored.

Next, the steel is prepared for fusion welding as described in Example 2, then is fusion butt welded to produce steel weld 53 by the process described in Example 2. Normally, the steel butt weld will be inspected for quality by X-ray techniques and any defective areas will be repaired before proceeding to the next step. A tantalum or tantalum alloy inlay insert 54 is placed to fit groove 52.

Then, purging holes 55 are drilled through the center of the steel weld 53 and the tantalum inlay insert 54 to provide for purging of the root side of the tantalum alloy welds to be made on the liner side of the wall. These purging holes 55 normally are left open even after completion of entire welded wall assembly since these holes then serve a second purpose of being used for leak detection during service.

The edges of the tantalum alloy liner 49 wall are bent back into flush contact with inlay 54. A tantalum or tantalum alloy additonal insert 56 is cut to fit the space between the abutting edges of the liner 49 of the two members. Then, inert gas shielded tungsten arc welds 57 and 58 are made as described in Example 1 to join the additional insert 56 to the abutting edges of liner 49 and to inlay insert 54, thus completing the welded wall assembly.

Inspection of a welded wall assembly made from the tantalum-copper-steel triclad material will show good soundness in both the steel weld and tantalum alloy welds by penetrant dye and X-ray radiograph inspection.

EXAMPLE 5

Figure 16:
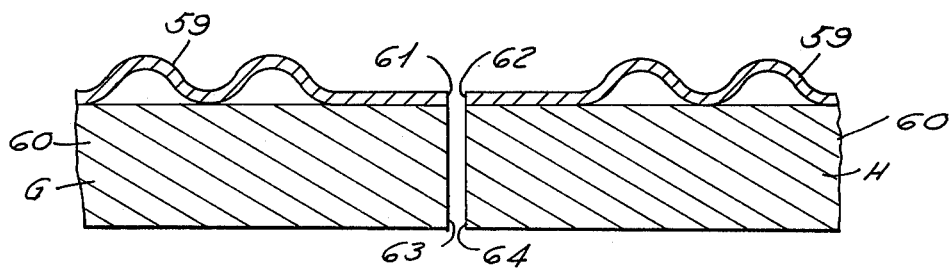

An alternative sequence of steps that can be used to produce the wall construction of this invention is illustrated in FIGS. 16 through 23. This example demonstrates the steps as applied to fabricating a welded wall assembly from two members G and H, each comprised, as shown in FIG. 16, of an unbonded tantalum material liner 59 and a mild steel backing 60. The abutting edges of the two members are initially cut smooth and parallel as shown in FIG. 16 for the edges 61 and 62 of the liner and 63 and 64 of the steel.

Figure 17:
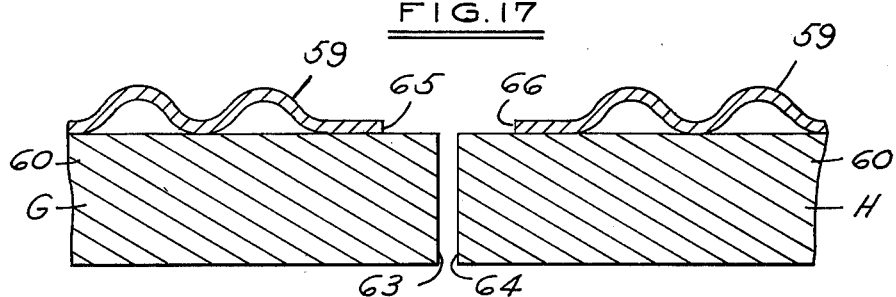

Then, the liner 59 is cut back on both members as illustrated in FIG. 17 to provide a space of ½ inch minimum between edges 65 and 66.

Figure 18:
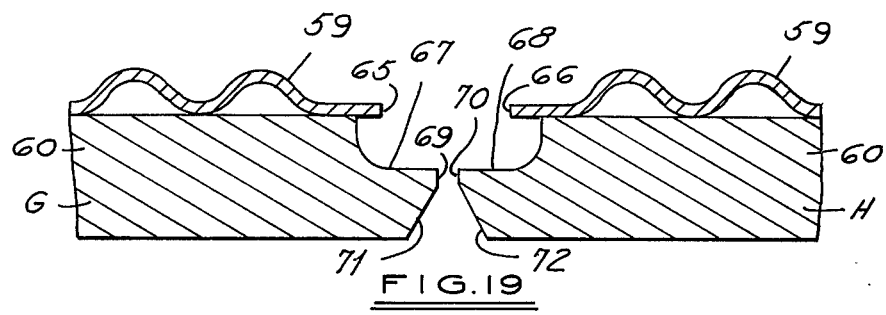

Next, the steel backing of both members is machined as illustrated in FIG. 18 to provide grooves 67 and 68 having a depth of about ⅛ inch and a width of ½ inch minimum in each member. The steel is further machined to prepare an appropriate groove for fusion welding having root faces 69 and 70 and groove faces 71 and 72.

Figure 19:
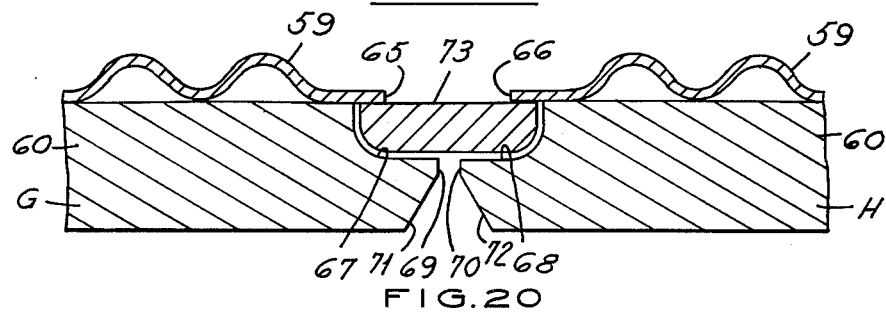
Figure 20:
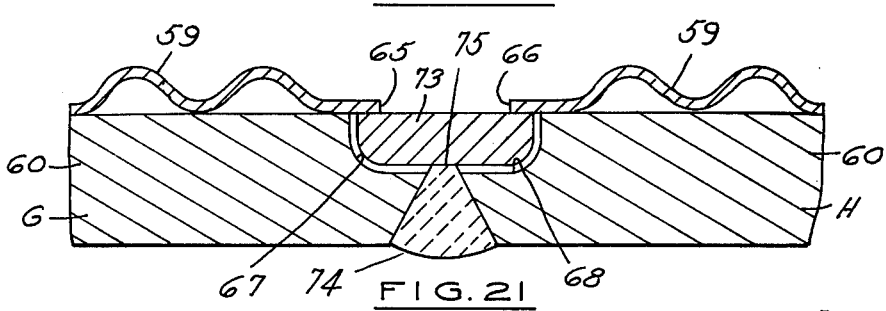

An insert 73 of unalloyed tantalum or tantalum alloy of essentially the same composition as liner 59 is prepared to fit and telescope into grooves 67 and 68 when the machined, cleaned (as described in Example 1) members are brought together as illustrated in FIG. 19.

The steel fusion weld 74 is made conventionally except that the tantalum material insert 73 acts as a backer at the root 75 of the steel weld. Because of the much higher melting point of the tantalum material than steel, the steel weld can be made with essentially no alloying with the tantalum at the weld root 75. The weld reinforcement on the face side of the steel weld may or may not be dressed down smooth with the outside surface of the steel. Normally, the steel butt weld will be inspected for quality by X-ray techniques and any defective areas will be repaired before proceeding to the next step.

Figure 21:
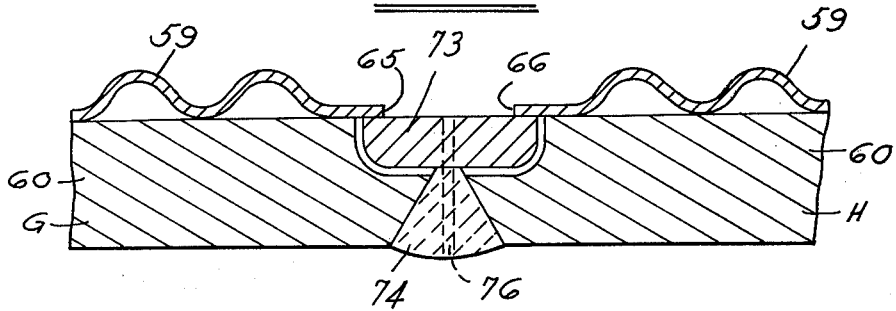

Purge holes 76 are drilled as illustrated in FIG. 21 through the steel weld 74 and the tantalum alloy inlay 73. These purging holes normally are left open even after completing the entire welded wall assembly, since these holes then serve a second purpose of being used for leak detection during service.

The area to be welded must again be thoroughly cleaned and be free from any contaminants after drilling the purge holes 76 before placing an additional insert 77 of tantalum material cut to fit flush and abut snuggly with edges 65 and 66 of the tantalum material liner 59 as shown in FIG. 22. The width of the insert 77 should be a minimum of about ½ inch and the thickness should be the same as that of liner 59. In some cases where the tantalum alloy liner is thin, such as 0.040 inch or even thinner, edges 65 and 66 of liner 59 and the edges of insert 77 may be bent upward to provide a lip which when melted down in the subsequent welding will provide at least a portion of filler material for the joint.

Adequate cleaning of the tantalum materials is mandatory done as was described in Example 1. The welding procedure used for making the final welds 78 and 79, shown in FIG. 23, follows that described in Example 1. If desired, filler material of the same composition as the tantalum material being welded may be added so as to achieve good quality, complete penetration butt welds 78 and 79 joining the tantalum insert 77 to inlay 73 and to abutting edges 65 and 66 of liner 59 on sections G and H, thus completing the welded assembly.

Such completed welded wall assemblies should show a relatively flush and smooth surface on the tantalum alloy clad side, which is desirable to avoid projections on the chemical process side.

Such welds on both the steel side and the tantalum alloy side, when properly executed, should show no defects when tested by penetrant dye inspection and by X-ray radiographs.

This same alternative fabrication process can be used to assemble walls where the tantalum material may be bonded to the steel substrate on one or both members to be joined. The principal additional precaution that must be observed in these cases is that sufficient tantalum must be removed from the underside of the tantalum material liner to remove any areas of iron or other foreign metallics before it is welded as discussed in Example 2.

This alternative fabrication process also can be used to assemble walls having more than two layers, as discussed in Example 4. Again, as in Example 2, any metallic or other contaminants on the tantalum material must be removed before welding.

COMPARISON TO STATE-OF-THE-ART

FIG. 24 illustrates a method used for several years to join thermal expansion compensated liners of tantalum or Fansteel 63 Metal on the interior of chemical process equipment such as vessels, towers and piping. The completed wall comprises the thermal expansion compensated liner 80 in contact with the steel substrate 81.

A steel strap 82 is placed on the process side of the steel shell, and a bolt 83 is used to attach strap 82 to steel shell 81 by drilling and tapping for insertion of bolt 83. The bolt may be further tack welded 84 to prevent it from loosening during service.

Then, inlay inserts or pads 85 and 86 of tantalum or Fansteel 63 Metal are placed on the tapered edges of steel strap 82. An additional strip 87 of tantalum or Fansteel 63 Metal is cut and formed to fit over the steel strap 82 and abut the liner 80 midway over inlay inserts 85 and 86.

Then, inert gas shielded tungsen arc welds 88 and 89 are made to attach the inlay 87 to liner 80 and to the inlay inserts 85 and 86, thus completing this battan strap type of construction.

Compared to this method of wall construction, methods of the present invention eliminate the need for the steel strap and bolt, thus avoiding the projection of a battan strap into the interior of the vessel and providing a much improved fit-up of the liner which is, therefore, more amendable to inspection of weld quality by X-ray techniques.

FIG. 25 shows the welded wall joint assembly according to the teachings of U.S. Pat. No. 3,443,306. The completed assembly is comprised of a triclad bonded wall with a tantalum layer 90 bonded to an intermediate copper layer 91 which is bonded to the steel substrate 92.

The two members of the wall are joined by a fusion butt weld 93 in the steel members. A filler piece 94 is placed in a channel in the tantalum and copper layers, and the space between this filler and the tantalum plus copper layers is filled with silver brazing alloy 95.

Purging holes 96 are used to flush the root side of the tantalum alloy welds. An overlay battan strap 97 of tantalum is joined to tantalum layer 90 by fillet welds 98 and 99 to complete the welded wall assembly.

Compared to the method of the prior art in FIG. 25, the method of the present invention is not limited to a triclad tantalum plus copper plus steel type of material, but instead can be applied not only to this material combination but also to a vast number of combinations of dissimilar materials, and can be used with either bonded or unbonded layers of materials, as discussed previously. Further, the method of this invention provides a relatively smooth and flush surface on the process side without a projection such as a battan strap construction, such as shown in FIG. 25.

In addition, the method of this invention incorporates butt welding of the individual layers of the wall construction. Butt welding of the tantalum liner provides a much stronger joint than a fillet weld type construction illustrated in state-of-the-art type wall construction to FIG. 25. The fatigue or endurance strength of a fillet weld is only about 20 percent that of a butt weld (R. Weck, "Avoiding Failures in Welded Constructon," Metals Progress, Volume 109, No. 4, April 1976, pp. 26 –43). Thus, methods of this invention provide a wall construction with improved strength and good integrity in each of the layers of the construction.

Fabricating a wall of the method of this invention has been illustrated by using several different types of wall construction. The method is shown by way of example, but is not limiting since the method can be applied to a broad spectrum of materials as covered by the claims.

What is claimed as new is as follows:

1. A wall joint for industrial and chemcial process equipment which comprises:
   a. a first base structural layer,
   b. a second corrosion resistant layer overlying said first layer,
   c. a fusion weld joining edges of said first layer in abutting relation,
   d. an inset insert of corrosion resistant material fusion welded in abutting relation to opposed edges of said second layer above said first layer, and
   e. an inlay insert of corrosion resistant material underlying said inset insert and said opposed edges of said second layer and recessed into said first structural layer over the fusion weld in said first layer.

2. A wall joint as defined in claim 1 in which the first and second layers on at least one side of said joint are in face-to-face unbonded contact.

3. A wall joint as defined in claim 2 in which the first and second layers on at least one side of said joint are bonded to each other in face-to face relation.

4. A wall joint as defined in claim 1 in which the structural layer of said joint material is selected from Groups IVA and VA metals of the Periodic Table and their alloys and said second layer is selected from metals of Groups IVA and VA and their alloys.

5. A wall joint as defined in claim 1 in which the structural layer is selected from an iron-base, nickel-base, cobalt-base and copper-base material, and said corrosion resistant layer is selected from metals and alloys including titanium, zirconium, hafnium, tantalum, columbium and vanadium.

6. A wall joint as defined in claim 1 in which said first structural layer is an iron-base material and said second corrosion resistant layer is a tantalum-base material.

7. A wall joint as defined in claim 1 in which said second layer and said inset insert and said inlay insert are selected from metals of Groups IVA and VA of the Periodic Table and their alloys.

8. A wall joint as defined in claim 1 in which said second layer and said inset insert and said inlay insert are a tantalum-base material.

9. A wall joint as defined in claim 1 in which the first layer is comprised of a copper bonded to mild steel.

10. A method of fabricating a wall which includes a layer of first metallic material and a layer of second metallic material, each layer having one face in overlying relation with the other layer, comprising the steps of:
  a. abutting an edge of two members of the wall, each member having a layer of first material and a layer of second material in face-to-face relation,
  b. cutting back the layer of second material a distance from and parallel to the abutting edge of each member,
  c. preparing the abutting edge of the first layer of each member for fusion welding,
  d. joining the abutting edge of the first layer of the members by fusion welding,
  e. machining a channel centered on the axis of said weld in the first layer on the surface of the first layer having the face-to-face relation with the second layer,
  f. inlaying an insert of second material in the channel in the first material,
  g. adding another inset insert of second material in the space between and flush with the cut back layers of second material, said additional inset insert having a face-to-face relation to the inlaid insert of s econd material in the channel of the first material, and
  h. fusion welding, under inert conditions, the additional insert of second material flush to the abutting cut back layers of second material and to the inlaid insert of second material.

11. A method of fabricating a wall as defined in claim 10 which includes selecting the first layer material from Groups IVA and VA metals of the Periodic Table and their alloys and said second layer material form Groups IVA and VA metals and their alloys.

12. A method of fabricating a wall as defined in claim 10 which includes selecting the first layer material from an iron-base, nickel-base, cobalt-base and copper base material, and selecting said second layer material from metals and alloys including titanium, zirconium, hafnium, tantalum, columbium and vanadium.

13. A method of fabricating a wall as defined in claim 10 in which said first layer material is an iron-base material and said second layer material is a tantalum-base material.

14. A method of fabricating a wall as defined in claim 10 in which said second layer, said inset insert and said inlay insert are selected from metals and alloys of metals of Groups IVA and VA of the periodic Table.

15. A method of fabricating a wall as defined in claim 10 in which said second layer, said inset insert and said inlay insert are a tantalum-base material.

16. A method of fabricating a wall which includes a layer of first metallic material and a layer of second metallic material, each layer having one face in overlying relation with the other layer, comprising the steps of:
  a. abuttin an edge of two members of the wall, each member having a layer of first material and a layer of second material in face-to-face relation,
  b. cutting back the layer of second material a distance from and parallel to the abutting edge of each member,
  c. bending the cut back layer of second material to expose the surface of the first layer of each member,
  d. preparing the abutting edge of the first layer of each member for fusion welding,
  e. joining the abutting edge of the first layer of the members by fusion welding,
  f. machining a channel centered on the axis of said weld in the first layer on the surface of the first layer having the face-to-face relation with the second layer,
  g. linlaying an insert of second material in the channel in the first material,
  h. bending the cut back layer of second material to obtain face-to-face relation to the inlaid insert of second material,
  i. adding another inset insert of second material in the space between and flush with the cut back layers of second material, said additional inset insert having a face-to-face relation to the inlaid insert of second material in the channel of the first material, and
  j. fusion welding, under inert conditions, the additional insert of second material flush to the abutting cut back layers of second material and to the inlaid insert of second material.

17. A method of fabricating a wall as defined in claim 16 which includes selecting the first layer material from Groups IVA and VA metals of the Periodic Table and their alloys and said second layer material from Groups IVA and VA metals and their alloys.

18. A method of fabricating a wall as defined in claim 16 which includes selecting the first layer material from an iron-base nickel-base, cobalt-base and copper-base material, and selecting said second layer material from metals and alloys including titanium, zirconimum, hafnium, tantalum, columbium and vandium.

19. A method of fabricating a wall as defined in claim 16 which said first layer material is an iron-base material and said second layer material is a tantalum-base material.

20. A method of fabricating a wal as defined in claim 16 in which said second layer, said inset insert and said inlay insert are selected from metals and alloys of metals of Groups IVA and VA of the Periodic Table.

21. A method of fabricating a wall as defined in claim 16 in which said second layer, said inset insert and said inlay insert are a tantalum-base base material.

* * * * *